J. H. VAN SICE.
HARNESS.
No. 179,141.                                Patented June 27, 1876.
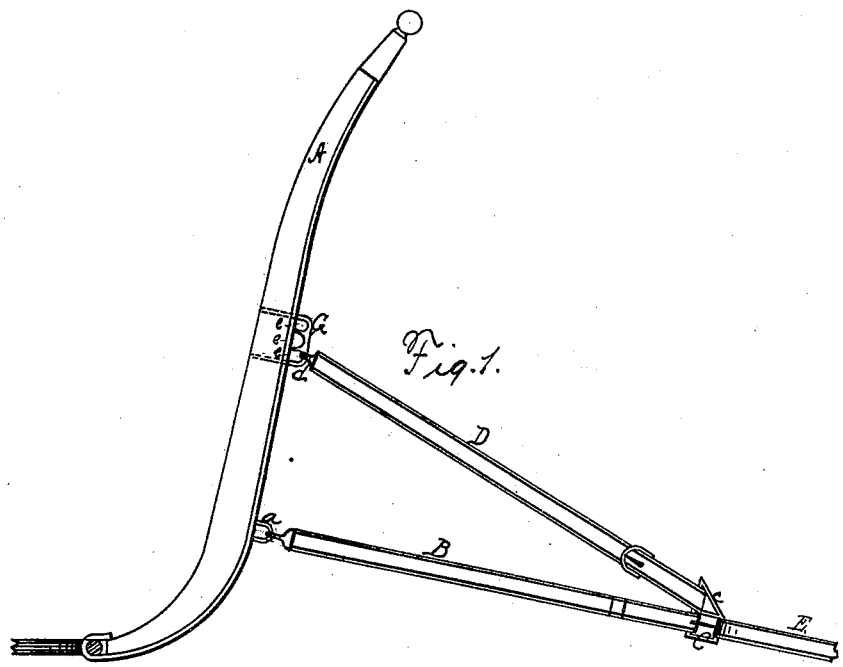
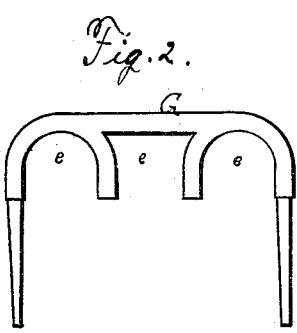
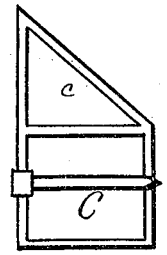
Witnesses:
T. H. Parsons.
J. R. Drake
James H. Van Sice,
Inventor, By
J. R. Drake
atty

UNITED STATES PATENT OFFICE.

JAMES H. VAN SICE, OF BUFFALO, NEW YORK.

IMPROVEMENT IN HARNESS.

Specification forming part of Letters Patent No. 179,141, dated June 27, 1876; application filed December 6, 1875.

*To all whom it may concern:*

Be it known that I, JAMES HENRY VAN SICE, of Buffalo, in the county of Erie and State of New York, have made certain Improvements in Harness, of which the following is a specification:

This improvement relates more especially to harness used in towing and drawing heavy weights, the object being to divide the strain and adjust it higher or lower on the hame and collar, all as hereinafter explained.

In the drawings, Figure 1 is a side elevation of one hame, showing the adjustable holder and other parts attached; Fig. 2, detail of holder, and Fig. 3 the buckle.

A represents one-half of a hame; B, a short strap attached to the hame by the usual staple $a$, and having a peculiarly-formed buckle, C, on the outer end, and to which the tug or trace D is buckled. The upper part of the buckle C is formed with a triangular portion, $c$, (see Fig. 3,) and has an adjustable strap, E, buckled thereto, as fully shown in Fig. 1. The other end of this strap is provided with a clip, $d$, which catches into an adjustable holder, G, made with three or more divisions, $e\ e\ e$, (see Fig. 2,) so that the clip can catch into either one, and thereby relieve the strain on a particular spot. This holder G and strap E not only divide the strain of the tug and equalize the bearing on the horse's shoulders, but also permit an adjustment up or down to relieve the animal's shoulder, if it should become raw.

These holders G will be constructed in one piece of metal, and fastened to the hames at a suitable point.

These devices are more especially intended for the harness of canal horses; but they will be equally useful for heavy teaming, &c.

I claim—

The straps B, D, and E, and buckle C, in combination with a hame having loop $a$ and holder G, the latter provided with divisions $e\ e\ e$, substantially as herein shown and described.

In witness whereof I have hereunto signed my name in the presence of two subscribing witnesses.

JAMES H. VAN SICE.

Witnesses:
J. R. DRAKE,
T. H. PARSONS.